United States Patent [19]
Hawes

[11] 3,728,030
[45] Apr. 17, 1973

[54] POLARIZATION INTERFEROMETER
[75] Inventor: Roland C. Hawes, Monrovia, Calif.
[73] Assignee: Cary Instruments, Monrovia, Calif.
[22] Filed: June 22, 1970
[21] Appl. No.: 48,415

[52] U.S. Cl. ................................. 356/106, 356/114
[51] Int. Cl. ........................... G01b 9/02, G01r 21/40
[58] Field of Search ........................... 356/106–113, 356/114–117, 33

[56] References Cited

UNITED STATES PATENTS 3,446,557    5/1969    Wilkinson ........................... 356/225

OTHER PUBLICATIONS

"Elliptical Polarizer," 50 JOSA XIV.

*Primary Examiner*—Ronald L. Wibert
*Assistant Examiner*—Conrad Clark
*Attorney*—White & Haefliger

[57] ABSTRACT

Fourier spectroscopy is used in the measurement of circular dichroism, the method involving the use of an interference polarization modulator which is characterized by production of negligible amplitude modulation in the absence of dichroism in the optical train that follows the modulator and in the detector. Either linear or circular dichroism in that region of the instrument will convert the polarization modulation into amplitude modulation. The polarization modulation is characterized by a different frequency for each wavelength of the radiation, thus the signals caused by the interaction of the radiation with dichroic sample may all be recorded simultaneously and may subsequently be "unscrambled" to derive the inverse Fourier transform of the ensemble of frequencies constituting the complete signal, and thus obtaining a transmission spectrum corresponding to the dichroism. The transmission spectrum in turn, in the case of the circular dichroism, may be converted into dichroism by dividing by the ordinary transmission spectrum (corresponding to ordinary absorption) which may be derived by ordinary Fourier spectroscopy.

24 Claims, 5 Drawing Figures

INVENTOR.
ROLAND C. HAWES
BY White & Haefliger
ATTORNEYS.

POLARIZATION INTERFEROMETER

BACKGROUND OF THE INVENTION

This invention relates generally to apparatus for measuring polarization-dependent optical properties of samples, and more particularly concerns the application of interferometric techniques with associated scanning in such measurements.

In the past, and as exemplified in U. S. Pat. No. 3,257,894, the measurement of circular dichroism (a very useful optical property of substances, and defined as the difference in absorption of an optically active sample when determined using left-circularly polarized light and right-circularly polarized light), has involved the step of obtaining the ratio of alternating and direct current components of an electrical signal obtained at the output of a detector such as a phototube. Light incident upon the detector, and resulting in production of that signal, is typically derived by transmission as a beam from a source including a monochromator and through a polarizer, then through a polarization or electro-optic modulator wherein the plane polarized light is elliptically polarized in a cyclically varying manner (characterized by two counter-rotating, circularly polarized components, the relative magnitudes of the two components changing cyclically in time — at a "modulation frequency" — so that the dominant component is alternately right- and left-circularly polarized), and finally through a sample. The latter, when circular-dichroic, absorbs unequally the circularly polarized components of opposite sense and of periodically varying polarization, so that the total amount of light incident upon the phototube undergoes a corresponding periodic variation, i.e. larger when the predominant circularly polarized component of the light passing through the sample is of the sense absorbed to lesser degree by the sample, and smaller when the predominant circularly polarized component is of the sense absorbed to greater degree by the sample. The fluctuating component of the phototube output is of frequency equal to the modulation frequency and with amplitude proportional to the difference between transmission levels for the circularly polarized components of opposite sense. The DC component on the other hand corresponds to the average or mean transmission of the sample for light at the wavelength of interest.

The above and similar systems require the provision of much expensive equipment, including the monochromator and electro-optic modulator. While much thought has been given to the possible elimination of such equipment, the principles of operation as outlined above remain embodied in existing apparatus for measuring dichroism in samples, i.e. successful substitutes have not been found.

Equipment for measuring circular dichroism is usually easily adapted to the measurement also of linear dichroism, defined as the difference in absorption of a sample for linearly polarized light with the direction of polarization corresponding to maximum absorption by the sample and a direction orthogonal to the maximum absorption direction. Linear dichroism is another useful optical property of substances and is the property upon which, for instance, the useful characteristics of sheet polarizers such as "Polaroid" depend. It may be measured by the equipment described above by introducing a ¼ wave "bias" in the polarization characteristics of the light beam by superimposing a sufficient unidirectional potential upon the electro-optical modulator in addition to the alternating potential, or by inserting in the light beam a ¼ wave retarder of conventional design. The light beam passing through the sample then varies cyclically between two orthogonal linearly polarized components. At the modulation frequency a linearly dichroic sample absorbs these two components unequally producing corresponding periodic variations in the amount of light incident upon the phototube.

Existing systems, as will be evident from the above description, also are limited in that measurements of dichroism spectra must be made one wavelength band at a time, the bands being changed in succession by a scanning mechanism in the monochromator. This is particularly troublesome in the infrared region of the spectrum where, owing to the very small amounts of dichroism ordinarily encountered, and to the below mentioned "constant noise" property of usual photometric detection systems, a very long time must be taken for the measurement at each wavelength band in order to accumulate enough information to permit accurate estimates of such small differences in absorption.

In ordinary absorption measurements, it has been known for some time that by using methods commonly called "Fourier spectroscopy", employing an interferometer, measurements could be made at many wavelengths simultaneously, each wavelength being characterized by a different signal frequency imposed on the radiation falling on the detector. The signals are subsequently "sorted out" according to frequency by a mathematical process characterized by taking the inverse Fourier transform of the signals collected and electrically recorded from the detector. By making measurements at many wavelengths simultaneously, it is possible to obtain as accurate or more accurate measurements at each wavelength as could have been obtained in the same time at a single wave band with the use of a monochromator for wave band isolation, assuming constant detector noise, equal optical bandwidth or resolution, equal transmission efficiency, and equal "light grasp" or "throughput". Heretofore, however, it has not been possible to apply this technique or operating principle to the measurement of dichroism because no method was known for making a polarization modulator having modulation characteristics for dichroism analogous to those of conventional Michelson interferometers for intensity modulation of different wavelengths simultaneously at different frequencies.

Another advantage of interferometric modulation lies in the fact that it is practical for a given resolving power of the apparatus to transmit more radiation through an interferometer than through a monochromator. This is for two reasons: The first is that the light grasp, that is, the geometrical factor determining the capability of the apparatus to transmit radiation, is recognized to be greater for an interferometer than for a monochromator. The second is that the monochromator usually contains many more optical elements, each of which introduces some loss in the system; thus, the transmission efficiency of the monochromator can easily be less even for a given single wavelength than that for an interferometer despite the fact that a typical beam splitter in an interferometer reduces the light intensity transmitted through the interferometer by a factor of two at the beam recombining point, half of the radiation being returned toward the source.

SUMMARY OF THE INVENTION

It is a major object of the invention to provide a solution to the above problems and characterized in that need for the monochromator, polarization modulator and associated equipment is eliminated, an interferometric apparatus being substituted and adapted to use in the measurement of dichroism, both linear and circular.

Generally speaking, the invention concerns the use of Fourier spectroscopy in the measurement of circular dichroism. The method involves the use of an interference polarization modulator which is characterized by production of negligible amplitude modulation in the absence of dichroism in the optical train that follows the modulator and in the detector. Either linear or circular dichroism in that region of the instrument, however, will convert the polarization modulation into amplitude modulation. The polarization modulation is characterized by a different frequency for each wavelength of the radiation, thus the signals caused by the interaction of the radiation with dichroic sample may all be recorded simultaneously and may subsequently be unscrambled by simple electronic frequency isolation, or, preferably, by the use of a computer to derive the inverse Fourier transform of the ensemble of frequencies constituting the complete signal, and thus obtaining a transmission spectrum corresponding to the dichroism. The transmission spectrum in turn, in the case of the circular dichroism, may be converted into dichroism by dividing by the ordinary transmission spectrum (corresponding to ordinary absorption) which may be derived by ordinary Fourier spectroscopy.

Typically, and as respects measurement of dichroism, the invention is embodied in dichroism measurement apparatus that comprises a source of light of different wavelengths, polarization interferometer means including relatively movable reflectors for processing source light to provide a beam characterized, for each wavelength, by ellipticity that alternates between left and right circular polarization and between which the beam polarization becomes linear in one direction as the ellipticity alternates from left to right circular polarization, and linear in another direction as the ellipticity alternates from right to left circular polarization, the characteristic frequency $\nu$ of such alternation varying as a function of the light wavelength; a sample space located for effecting passage of the elliptically polarized beam through a dichroic sample in that space, the sample differentially absorbing the left and right polarized light of a characteristic wavelength $\lambda$ a if the sample is circularly dichroic, and differentially absorbing the parallel and perpendicular linearly polarized components of the polarized light if the sample is linearly dichroic; and, a beam intensity detector located in the path of the beam passing from the sample space and characterized as having signal output that varies with frequency when the sample is in that space, the output adapted for processing to produce dichroic spectra varying with wavelength $\lambda$. Typically, the processing apparatus may include an amplifier, a digitizer, and means such as a computer or filter connected with the digitizer to derive data representing the dichroic spectra as a function of wavelength $\lambda$, the computer programming providing the transform to convert intensity as a function of ellipticity alternation frequency to dichroism as a function of wavelength $\lambda$. In this regard, and as will appear, such frequency is a function of wavelength, for a given scan velocity of the relatively movable reflectors or other movable interferometer components. Further, the invention is also adapted to the measurement of either circular or linear dichroism, as will appear.

Although various interferometer means can be employed, the polarization interferometer may typically include a beam splitter located for both passing and reflecting components of linearly polarized source light, one component to be subsequently reflected by the relatively movable mirror or mirrors and the other by the fixed mirror; and actuating means for effecting the relative movement to control the frequency $\nu$. Further, as will appear, the polarizer, splitter and reflectors may be located to orient the light polarization vectors in a three dimensional orthogonal system having X, Y and Z axes, and characterized in that the polarization vector of light traveling in the direction of one of the axes from the polarizer to the splitter and through the splitter toward one reflector is oriented in the direction of a second of the axes; the polarization vector of light returning to the splitter after reflection by the one reflector is oriented in the direction of a third of the axes referred to; and the polarization vector of light reflected by the splitter and then returned toward the splitter after reflection by the second reflector is oriented in the direction of the first axis. In this regard, the light traveling in the X-direction toward the splitter may be polarized in the Y-direction of the light traveling in the Y-direction toward the splitter is polarized in the Z-direction; alternatively, the light traveling in the X-direction may be polarized in the Z-direction if the light traveling in the Y-direction is polarized in the X-direction. The fundamental requirement is not one of particular directions, but that the recombined polarization directions, considered separately, be orthogonal.

With respect to passage of the beam through the sample, for pure circular dichroism the sample exhibits no difference in absorption for linearly polarized light, no matter how it is oriented in the beam. In the case of linear dichroism, exactly the opposite occurs. The sample, when oriented correctly in the beam, shows a difference in absorption for linearly polarized radiation with one direction of linear polarization from that with the orthogonal direction of linear polarization. If the sample is purely linearly dichroic, it shows no difference in absorption for the circularly polarized components.

Since the signal for pure linear dichroism is, at a given wavelength, exactly in quadrature with the signal for pure circular dichroism, these two signals can be independently demodulated by the cosine and sine demodulation function respectively.

Further, to become linearly dichroic, specimens must be solid, or subjected to shearing forces if liquid. If such specimens can be rotated about the axis of the beam passing through them, the linear dichroism can be determined by the difference between two measurements with the sample in the two perpendicular orientations giving the greatest linear effects, and thus any instrumental bias caused by instrumental response (i.e., not caused by the sample) can be eliminated, provided it is not so large as to "swamp out" the effects sought. Also, linear dichroism tends to be much larger than circular dichroism so that avoidance of any interference is not so critical if it alone is to be measured.

These and other objects and advantages of the invention, as well as the details of illustrative embodiments, will be more fully understood from the following description and drawings, in which:

DRAWING DESCRIPTION

DETAILED DESCRIPTION

Figure 1:
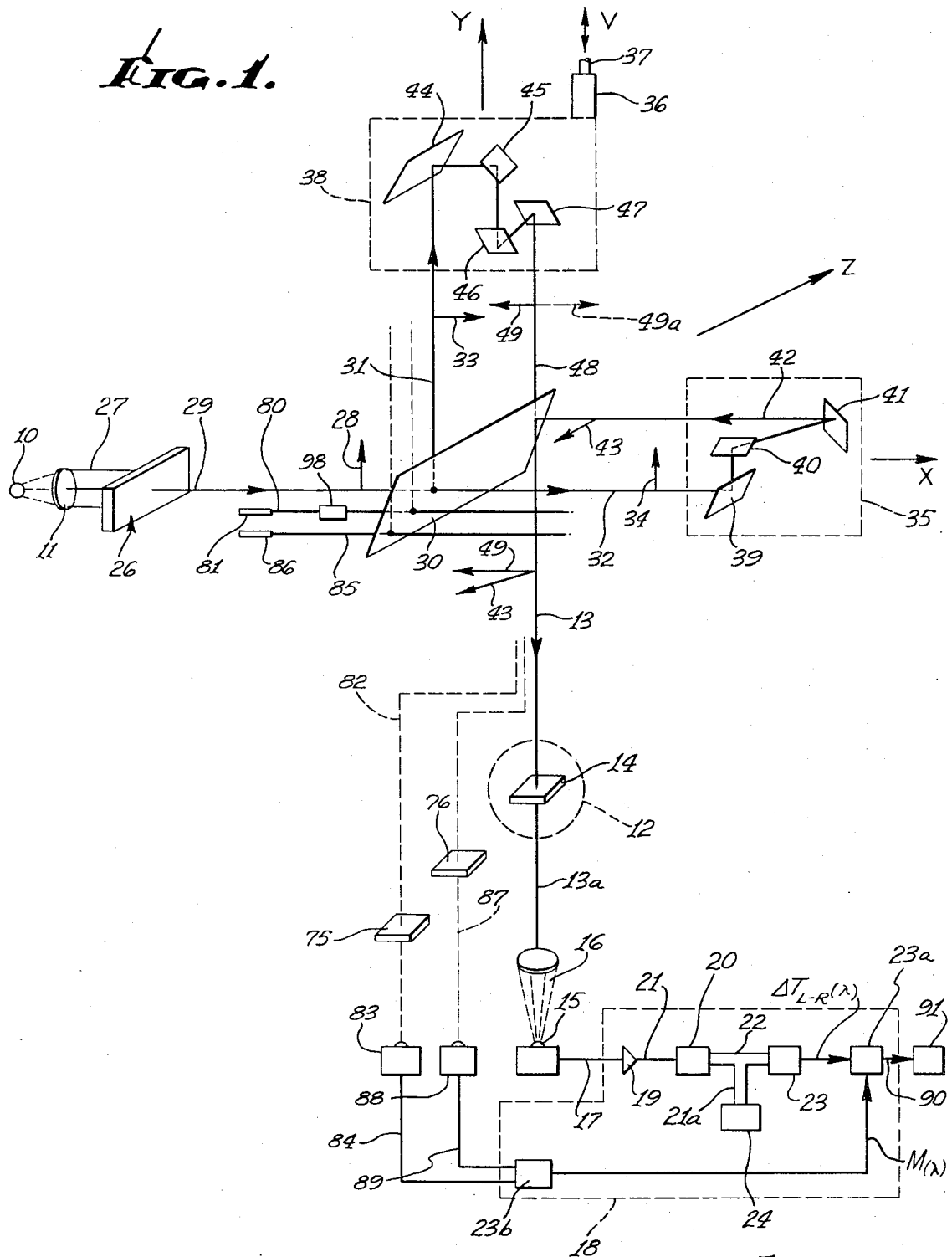
FIG. 1 is an overall system diagram.
Figure 2:
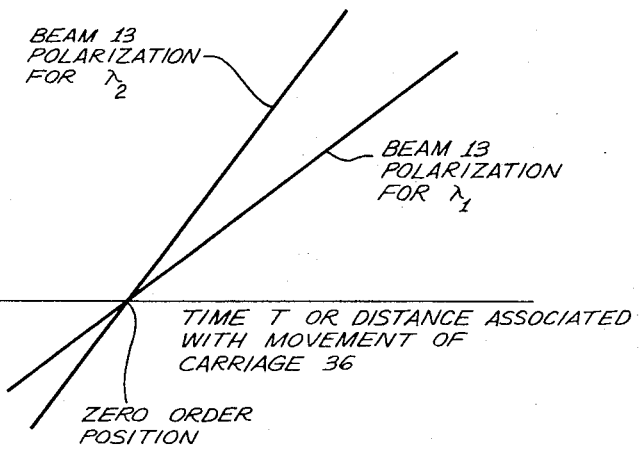
FIG. 2 is a diagram illustrating fluctuation of polarization as a function of time, for two wavelengths.

Referring first to FIG. 1, having to do with measurement of circular dichroism, a light source and collimating lens are indicated at 10 and 11, the source providing broadband electromagnetic radiation such as light of different wavelengths λ. Between the source and the sample space 12 is located what may be referred to generally as polarization interferometer means including relatively movable reflectors for processing source light to provide a beam at 13 characterized, for each wavelength, by ellipticity that alternates between left and right circular polarization and between which the beam polarization becomes linear with direction alternating from one which may be referred to as parallel or $p$ to one which may be referred to as perpendicular or $s$, such notation being conventional, the frequency $\nu$ of such alternation being a function of light wavelength, i.e.

$$\nu_a = F(\lambda_a) \quad (1)$$

where, $a$ = numbers associated with particular wavelengths $\nu_a$ = ellipticity alternation frequencies associated with particular wavelengths FIG. 2 depicts such fluctuation of polarization as a function of time $t$, for particular wavelengths $\lambda_1$ and $\lambda_2$, and may be generalized to other wavelengths by including lines of other slopes representative of other wavelengths, each passing through the zero optical phase axis at the zero order point. In the interferometer of FIG. 1, the slope of each line is inversely proportional to the corresponding wavelength.

The sample space 12 is located for effecting passage of the beam 13 through, for example, a circularly dichroic sample 14 in that space, the sample typically differentially absorbing the left and right circularly polarized light of a characteristic wavelength. A beam intensity detector 15 is located in the path of the beam 13a that has passed from the sample space 12, a condenser 16 typically being inserted in that path to reduce the size of the beam at the detector. The intensity of the detector output signal at 17 is characterized as varying with frequencies $\nu_a$ when the sample 14 is in the space 12.

Figure 3:
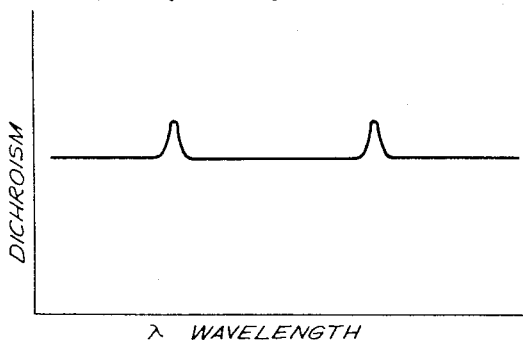
FIG. 3 is a waveform illustrating dichroism as a function of wavelength.

The detector output, an interferogram function $F(\nu_a)$, is subsequently processed by apparatus generally designated at 18 to produce dichroic spectra varying with wavelength λ, as seen in FIG. 3.

In the absence of a sample, the detector ideally produces a constant (or DC) output, except for noise or random fluctuations. The term "ideally" is used because a detector which is completely free of response to linear polarization is very unusual. In practice, advantage is taken of the face that the circular dichroism is at quadrature with the signal resulting from linear effects, and can, therefore, in principle, be completely isolated from the linear response in the computation. In practice, of course, this isolation is never complete, but by careful adjustment and design it may be very helpful.

The illustrated apparatus 18 may include an amplifier 19 the input of which is connected to receive the detector output 17; a digitizer 20 (as for example an analog to digital converter) connected to receive the analog output 21 of the amplifier to provide a corresponding digital output 22; and a digital computer 23 operatively connected with the digitizer to derive a Fourier transmittance dichroism spectrum $\Delta T_{L-R}(\lambda)$ or $\Delta T_{p-s}(\lambda)$ as indicated, and in accordance with the equation $\Delta T_{L-R}$ or $$\Delta T_{(p-s)} = \int_{\nu_1}^{\nu_2} F(\nu_a) \times M(\lambda_a) d\nu$$

the demodulation function M (λ) being defined below.

A Fourier spectroscopy transmittance spectrum T (λ) is derived for the ordinary transmission of the same sample, as is conventional, and the computer component 23a then divides $\Delta T_{L-R}(\lambda)$ or $\Delta T_{p-s}(\lambda)$ by T (λ) to obtain at output point 90 the approximate absorbance spectrum $\Delta A_{L-R}(\lambda)$ corresponding to circular or linear dichroism respectively, as is represented in FIG. 3. A linear or circular dichroism display is indicated at 91 in FIG. 1. If desired, output 21a from the digitizer may be recorded by recorder 24 for later processing by the computer. An alternative method for deriving the spectrum T (λ) would merely involve turning the initial polarizer 26 so that its polarization effect lies at 45° to the direction shown, followed by re-running the system and computation of the integral defined above. Alternatively, the spectrum T (λ) may be obtained by merely removing the polarizer, which would be preferable if measuring linear dichroism.

Referring back to FIG. 1, the relatively movable reflectors included in the means to provide beam 13 may have an associated scan velocity $V$ characterized in that, for any selected wavelength $\lambda_a$ of the light provided by source 10, there is an associated frequency $\nu_a$ of beam ellipticity alternation as described above, and as may for example be represented by the following equation:

$$\nu_a = (2V/\lambda_a) \qquad (2)$$

This equation represents one form which Equation (1) may take, and means to be described will, in general, function to satisfy Equation (2). Equation (2) may be looked upon as representing the condition that each wavelength $\lambda_a$ goes through the polarization cycle at a characteristic speed. Thus, in FIG. 2, wavelength $\lambda_1$, goes through the polarization cycle with a period $T_1$ associated with frequency $\nu_1$; whereas, the wavelength $\lambda_2$ goes through its polarization cycle with a period $T_2$ associated with frequency $\nu_2$, $T_2$ being different from $T_1$, in general. Note that these occur for the same scan velocity $V$ of relatively movable mirrors in the interferometer means to be described.

While one interferometer means will now be described, and while it has unusually advantageous characteristics, other devices performing the same function are to be considered as falling within the scope of the invention. As illustrated, a linear polarizer 26 operates upon the source light beam 27 to linearly polarize same, as for example is represented by the vector 28 in beam 29. A beam splitter 30 is located for reflecting a component of light beam 29 to form reflected beam 31, and for passing a component of beam 29 to produce beam 32, with associated polarization vectors 33 and 34. Vectors 28 and 34 are oriented in the Y-direction, and vector 33 is oriented in the X-direction, in the rectangular coordinate system shown.

Reflector means generally designated at 38 is movable relative to reflector means 35 and to the splitter 30, and also in the positive or negative Y-directions, and at velocity $V$, as described. For this purpose, the said means may be mounted on a carriage 36 movable by actuator 37. Reflector group 38 may include the reflectors 44, 45, 46 and 47 arranged to produce a beam 48 returning to the splitter with a characteristic polarization vector 49 oriented in the X-direction but shifting in optical phase due to the mirror motion, as suggested by the solid and broken lines 49 and 49a. Reflector group 35, on the other hand, may include reflectors 39, 40 and 41 arranged as shown to operate upon beam 32 to produce a return beam 42 with a polarization in the direction of vector 43 in the direction of the Z-axis. Beams 42 and 48 are recombined at the splitter 30 to produce beam 13, with associated polarization modulation described below in connection with FIG. 4. In this regard, the time coordinate t as shown in FIG. 2 may be looked upon as determining the phase difference $\Delta\phi$ between vector 43 and vector 49, or as corresponding to the distance of travel of actuator 37. Beams 42 and 48 are separate but coherent linearly polarized beams of approximately equal intensity, and having orthogonal polarization directions; also, one of these beams is progressively retarded in phase with respect to the other, the retardation rate being different for different wavelengths within the band.

In the apparatus of FIG. 1, it may be noted that at each mirror of the relatively movable mirrors 35 and 38, the beam is turned through an angle of 90°, and travels parallel to one of the axes X, Y or Z. Thus, the normals to these mirrors lie at 45° to the corresponding pair of axes, the normal to mirror 39 lying in an XY plane and at 45° to these directions, the normals to the remaining mirrors being similarly related to axis directions as follows: mirror 40 to a YZ plane, mirror 41 to an XZ plane, mirrors 44 and 45 to an XY plane, and mirrors 46 and 47 to a YZ plane.

Furthermore, an equally satisfactory apparatus can be made by turning mirror 39 so its normal lies in the XZ plane, with the normals to mirrors 40 and 41 lying in the YZ and XY planes, respectively, and with the center of mirror 40 correspondingly relocated.

Similarly, the mirrors of movable reflector 38 could be redisposed so the beam between mirrors 44 and 45 travels in the Z direction, between 45 and 46 in the Y direction, and between 46 and 47 in the X direction. Other arrangements of the movable reflectors 38 are possible; for instance, one in which the three beam segments between the four mirrors all lie in one plane perpendicular to the incident and emergent direction. In all desirable arrangements of the beam splitter and of the relatively movable mirrors, the polarization vectors of the beams should lie either in the plane of incidence or perpendicular to it at each reflection, to minimize ellipticity otherwise caused by the reflections.

It should be observed that the light 42 traveling in the negative X-direction toward the beam splitter may be polarized in the Y-direction if the light 48 traveling in the negative Y-direction is polarized in the Z-direction. The fundamental requirement here is not of particular directions, but that the recombined polarization directions be orthogonal. More accurately, the separate beams which are recombined by the interferometer, if considered independently of each other, must be coaxial and have polarization vectors lying in orthogonal directions. It is not at all necessary that one of these directions be the Z-direction and the other the Y- or X-direction; however, in the practical apparatus, there are good reasons associated with the properties of known mirrors and beam splitters which make it desirable to have the one vector orientation the Z-direction, while the other is the X- or Y-direction. To reiterate, it is arbitrary which beam produces the one orientation, and which the other, just as it is arbitrary which of the arms of the interferometer is moved to change the path length of one beam with respect to the other.

It is important that the two beams of linearly polarized radiation, which are recombined by the interferometer and which have polarization vectors as described above, do not fluctuate in intensity or amplitude. Otherwise the instrument would respond to ordinary absorption, and this much larger effect would tend to mask any circular dichroism as well as altering the apparent magnitude of any linear dichroism. The described interferometer can be adjusted to produce substantially no amplitude modulation of the combined beams at 13.

In the form of my invention described herein there must be an even number of mirrors in one path and an odd number in the other path. Only this configuration, will cause the polarization vectors returning to the beam-combining section of the beam splitter to be oriented at exactly 90° to each other after combination. There are many multiple mirror interferometers but none with the described property. See for instance J. E. Shaw, JOSA, 57, p. 1136 (September 1967), L. B. Scott, U.S. Pat. No. 2,841,049, Dale Pritchard, et al., Journal de Physique, 28, Supplement No. 3–4, p. 92, and M. V. R. K. Murty, JOSA, 50, p. 7 (January 1960). In fact, symmetry rather than dissymmetry in an interferometer is the conventional objective.

It should be noted that the movable set of mirrors may be in the path of either beam 31 or 32 and that either the even or the odd set can be moved, although it is preferable to move the even set, as described. It may also be desirable to note that the polarization vector of the incident radiation may be turned at 90° to its indicated position—in other words in the Z-direction—without affecting the operation at all.

A demodulation function M (λ) referred to above may be derived by operation of means for determining the position of the traveling carriage 36 with respect to the position where the two beam paths are equal as regards travel between the splitter and the reflector groups 35 and 38 and return (i.e. the so-called "zero-order" position). Such means may include a pair of auxiliary light beams, say in the visible region of the spectrum. One beam is a broad band beam 80 emanating from a source 81 to be polarized by a polarizer 98, and passing through the interferometer in offset relation to the beams 29, 31, 48, 32, 42 and 13 referred to above, but with the same total optical pathlengths between beam splitting and recombination. After recombination, the resultant beam at 82 is passed through a polarizer 75 or other strongly linearly dichroic device, and detected at 83 and the resultant signal is passed at 84 to the computer component 23b. The interferogram produced by this beam has a single strong spike or intensity maximum occurring approximately at the zero-order position, and thus identifying it and determining the zero phase position of the demodulation function M (λ).

The second beam 85 is a laser beam, generated at 86, and preferably having only one or a few axial modes, and being strongly linearly polarized. After passage through the interferometer in offset relation to the above discussed beams, but with the same optical pathlengths, the recombined resultant beam 87 is passed through a polarizer shown as 76, although the same dichroic element 75 may be used if desired, and detected at 88 and passed at 89 to the computer component 23b embodying a fringe counting and measuring system which enables the determination of the distance traveled by the carriage to be absolutely and accurately fixed, as by counting fringes from the zero-order position corrected for any difference in distance attributable to the dispersion of the phase shift caused by the extra reflection in the interferometer path containing the even number of mirrors. The output of the fringe counting system is then interpreted by the computer component 23b to provide the demodulation cosine or sine function M (λ), i.e. cos ($\nu_a t$) or sin ($\nu_a t$), required for the generation of the inverse Fourier transform, the cosine or sine corresponding respectively to linear or to circular dichroism, whichever is to be measured.

Samples exist which exhibit both linear and circular dichroism simultaneously. For a complete study the interferogram of such a sample would have to be processed in the computer twice, once with each demodulation function, and the two separate (linear and circular) dichroism spectra of such a sample would then be obtained. The circular dichroism spectrum would show absorption bands which always correspond to some of the wavelength positions for ordinary absorption, whereas the linear dichroism spectrum would not necessarily correspond to the ordinary absorption spectrum although it would commonly do so. To reiterate, the one interferogram carries the information for both linear and circular dichroism spectra.

Figure 4:
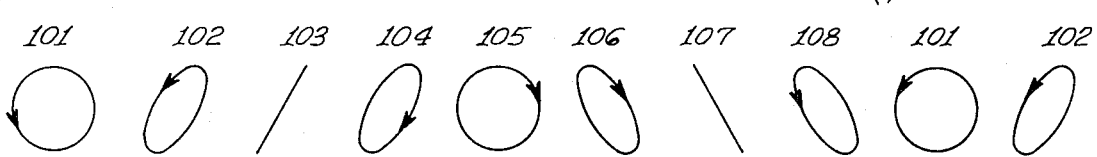
FIG. 4 is a polarization sequence as is characteristic of the invention.

Reference to FIG. 4 shows the modulation character of the recombined beams at 13 as passing through the repeated cyclic sequence of which the following is a complete cycle with arbitrary starting point:

101 — left circularly polarized
102 — elliptically polarized (left)
103 — linearly polarized in the p direction
104 — elliptically polarized (right)
105 — right circularly polarized
106 — elliptically polarized (right)
107 — linearly polarized in the s direction
108 — elliptically polarized (left)
101 — left circularly polarized
etc.

This sequence illustrates only discrete points in a continuous progression of elliptical polarization that results if two coherent beams of polarized radiation are combined coaxially and with their polarization vectors orthogonally oriented, and the phase of one beam is progressively increased with respect to the other.

As is conventional in absorption Fourier spectroscopy, the mirror motion may be either stepwise or continuous. Likewise, either the absolute value of the intensity or its differential with respect to pathlength may be measured.

The apparatus shown in FIG. 1 may be looked upon as one example of means to produce the above polarization sequence. Such means may include a Mach-Zender interferometer as shown and described in connection with FIG. 1.

Figure 5:
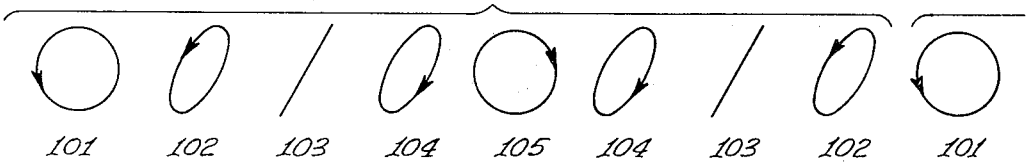
FIG. 5 is a polarization sequence as is characteristic of a conventional electro-optical modulator.

An important difference between the FIG. 4 polarization sequence and that produced by conventional electro-optical modulators (as for example that described in U. S. Pat. No. 3,257,894 to Grosjean) is that in the FIG. 4 sequence the linear phases at 103 and 107 are different, whereas in the sequence produced by the electro-optical modulator the linear phases have the same vector direction. See for example the linear phases 103 in the FIG. 5 sequence as produced by a conventional electrooptical modulator. The latter sequence progresses cyclically through five of the states shown in FIG. 4, beginning with the first state 101 or the thrid state 103 depending upon whether circular or linear dichroism is to be measured. It then returns through the same sequence in reverse, instead of progressing through the states 106, 107 and 108 as in FIG. 4. The Fourier modulator of my invention progresses through the complete cycle and then, continuing on, repeats the cycle again in the original sequence.

It is important that a clear distinction be made between operation in the infrared and operation in the ultraviolet or visible regions of the spectrum. It is well known that in the infrared, where measurements are not limited by the statistical arrival of photons, but rather by noise arising in the detector or in the amplifier used with the detector, or caused by the radiation field to which the detector is exposed on all sides, so that the noise per unit frequency bandwidth is substantially independent of the light intensity, the advantage in signal-to-noise ratio attainable through Fourier spectroscopy is much larger than when measurements are made with a good multiplier phototube. In the latter, the noise principally arises from the statistical distribution of arrival of photons and thus increases with the total light intensity falling on the detector. Thus, with the phototube, each added wavelength band included increases the noise in proportion to the square root of the total flux of photons. The increasing noise vitiates the gain which would otherwise occur in signal-to-noise ratio. In other words, while Fourier dichroism measurements may have advantages in the ultraviolet or visible regions of the spectrum, these advantages do not include the so-called "Fellgett advantage" that the time for measurement of a large number of bands simultaneously by Fourier Spectroscopy is approximately equal to that required for measurement of a single band by conventional spectroscopy using a monochromator to isolate the wavelength band wanted and to reject other bands.

Knowing the above advantages, it is of particular advantage to use the Mach-Zender interferometer, or other forms of polarization interferometers having the general properties described herein for use in the infrared measurement of dichroism.

In summary, the apparatus for measuring dichroism by Fourier spectroscopy may be considered broadly to comprise:

a. scanning interferometer means for receiving and modulating the polarization state of a linearly polarized beam of broadband electromagnetic radiation and operable to produce separate but coherent linearly polarized beams of approximately equal intensity, the beams having orthogonal polarization directions, one of said beams being progressively retarded in phase with respect to the other, the retardation rate being different for different wavelengths within the wavelength band of the radiation, said interferometer means combining said beams, with substantially no amplitude modulation of the combined beams, for subsequent passage through a sample, whereby amplitude modulation of the intensity of the combined beams results only if the sample exhibits dichroism at wavelengths within the band, b. detector means responsive to the beams passed through the sample for producing an electrical signal with frequency components corresponding to wavelengths at which the sample exhibits dichroism, and c. means responsive to said electrical signal to derive an output signal representative of an inverse Fourier transform of said electrical signal, said last named means including means for determining the relative retardation of said one beam with respect to said other beam.

I claim:

1. In dichroism measurement apparatus, the combination comprising,
   a. a source of electromagnetic radiation of different wavelengths $\lambda$,
   b. interferometer means for processing source radiation and wherein the phase between orthogonally polarized beams is varied to provide a resultant beam characterized, for each wavelength, by ellipticity that alternates between left and right circular polarization and between which the beam polarization becomes linear in one direction as the ellipticity alternates from left to right circular polarization, and linear in another direction as the ellipticity alternates from right to left circular polarization, the characteristic frequency $\nu_a$ of such alternation varying as a function of the wavelength,
   c. a sample space located for effecting passage of the elliptically polarized beam through a dichroic sample in that space, the sample differentially absorbing the alternately polarized radiation of a characteristic set of wavelengths $\lambda$, and
   d. a beam intensity detector located in the path of the beam passing from the sample space and characterized as having signal output that varies in intensity with frequency $\nu_a$ when said sample is in said space, said output adapted for processing to produce dichroic spectra varying with wavelength $\lambda$.

2. The combination of claim 1 wherein said means comprises a beam splitter located for passing and reflecting source light components in two beams each of which is reflected from relatively movable reflectors, and a linear polarizer in the beam path between the source and said splitter.

3. The combination of claim 2 including said sample in said space.

4. The combination of claim 2 including apparatus for processing said detector output to produce said dichroic spectra.

5. The combination of claim 4 wherein said apparatus includes a digitizer connected to receive and digitize a version of the detector output, and means operatively connected with the digitizer to derive data representing dichroic spectra as a function of wavelength $\lambda$.

6. The combination of claim 2 including actuating means for effecting such relative movement of the reflectors to control said frequencies $\nu_a$.

7. The combination of claim 6 wherein said actuating means is operatively connected to one of the reflectors which receives light from the beam splitter.

8. The combination of claim 7 wherein said polarizer, splitter and reflectors are located to orient the light polarization vectors in a three dimensional orthogonal system having X, Y and Z axes, and characterized in that the polarization vector of light traveling in the direction of one of the axes from the polarizer to the splitter and through the splitter toward one reflector is oriented in the direction of a second of the axes, the polarization vector of light returning to the splitter after reflection by said one reflector is oriented in the direction of a third of the axes, and the polarization vector of light reflected by the splitter in the direction of said second axis and traveling toward and away from the other reflector is oriented in the direction of the said first axis.

9. In apparatus for measuring dichroism of a sample, the combination comprising
   a. first means to produce an electromagnetic radiation beam passing successively through the following states with an alternation frequency $\nu$, in which $\nu$ varies with the wavelength of the radiation:
      i. circularly polarized in one rotary direction
      ii. elliptically polarized
      iii. linearly polarized in one linear direction
      iv. elliptically polarized v. circularly polarized in the opposite rotary direction
vi. elliptically polarized
vii. linearly polarized in another linear direction at an angle to said one direction
viii. elliptically polarized
b. said beam having little or no modulation of its intensity at any of the frequencies $\nu$,
c. a sample space located for effecting passage of the beam through a dichroic sample in that space and characterized as differentially absorbing the polarized radiation of a characteristic wavelength $\lambda$, and
d. processing means including a detector located in the path of the beam passing from the sample space and characterized as having signal output that varies with frequency when said sample is in said space, said processing means processing said output to produce dichroic spectra varying with wavelength $\lambda$.

10. The combination of claim 9 wherein said first means includes a polarization interferometer having movable beam reflecting structure.

11. The combination of claim 2 wherein said detector output defines an interferogram function F ($\nu_a$) and said processing means includes a computer operable to derive therefrom a Fourier transmittance dichroism spectrum $\Delta T_{L-R}(\lambda)$.

12. The combination of claim 11 wherein said computer is also operable to derive a Fourier spectroscopy transmittance spectrum $T(\lambda)$ for ordinary absorption, and to divide $\Delta T_{L-R}(\lambda)$ by $T(\lambda)$ to derive an approximate dichroism spectrum $\Delta A_{L-R}(\lambda)$.

13. The combination of claim 11 wherein the computer derives said spectrum by effectively performing the operation $$\int_{\nu_1}^{\nu_2} F(\nu_a) \cdot M(\lambda_a) d\nu$$

where $M(\lambda_a)$ is a sinusoidal function of unity amplitude and of frequency $\nu_a t$, and said processing means includes means generating values of said sinusoidal function of $\nu_a t$ as a function of the displacement of said relatively movable reflectors.

14. The combination of claim 13 wherein said last named means includes apparatus for transmitting auxiliary radiation beams to said interferometer means for processing thereby to produce measurable fringes modulated as a function of relative movement of the reflectors.

15. The combination of claim 4 in which the directions of polarization of the beams recombined by the interferometer means are orthogonal.

16. The combination of claim 6 wherein the direction of polarization of the light passed by the beam splitter is unchanged on being returned to the beam splitter, while the direction of polarization of the light reflected by the beam splitter is rotated by 90° on being returned to the beam splitter.

17. The combination of claim 6 wherein the direction of polarization of the light reflected by the beam splitter is unchanged on being returned to the beam splitter, while the direction of polarization of the light passed by the beam splitter is rotated by 90° on being returned to the beam splitter.

18. The combination of claim 9 wherein said processing means includes a circular dichroism display.

19. The combination of claim 9 wherein said processing means includes a linear dichroism display.

20. Apparatus for measuring dichroism by Fourier spectroscopy, comprising:
a. scanning interferometer means for receiving and molulating the polarization state of a linearly polarized beam of broadband electromagnetic radiation and operable to produce separate but coherent linearly polarized beams of approximately equal intensity, the separate beams having orthogonal polarization directions after recombination, one of said beams being progressively retarded in phase with respect to the other, the retardation rate being different for different wavelengths within the wavelength band of the radiation, said interferometer means combining said beams, with substantially no amplitude modulation of the combined beams, for subsequent passage through a sample, whereby amplitude modulation of the intensity of the combined beams results only if the sample exhibits dichroism at wavelengtes within the band,
b. detector means responsive to the beams passed through the sample for producing an electrical signal with frequency components corresponding to wavelengths at which the sample exhibits dichroism, and
c. means responsive to said electrical signal to derive an output signal representative of an inverse Fourier transform of said electrical signal, said last named means including means for determining the relative retardation of said one beam with respect to said other beam.

21. The combination of claim 20, in which said means to determine the relative retardation comprises,
a. means to produce a first auxiliary optical beam passing through the interferometer means and falling on an auxiliary detector for producing a signal identifying the zero order point of the interferometer scan, and
b. means to produce a second auxiliary optical beam passing through the interferometer means and falling on an auxiliary detector for producing a signal providing an accurate measure of the difference in optical paths of said two coherent beams.

22. The combination of claim 20 including means to derive the inverse Fourier transform of the absorption interferogram produced by the sample, and means to effectively divide said output signal by said inverse Fourier transform of said absorption interferogram produced by the sample.

23. The combination of claim 20 including electrical filter means to isolate said frequency components, and output means to register the amplitude of said frequency components.

24. The combination of claim 20 wherein said interferometer means has an even number of beam reflectors in one arm thereof and an odd number of reflectors in the other arm thereof.

* * * * *